United States Patent
Das

(10) Patent No.: US 8,887,122 B2
(45) Date of Patent: *Nov. 11, 2014

(54) FIND AND TRACK INFORMATION OF INTERFACE USAGE OF SOFTWARE LIBRARIES BY OTHER SOFTWARE

(75) Inventor: Kushal Das, West Bengal (IN)

(73) Assignee: Red Hat, Inc., Raleigh, NC (US)

( * ) Notice: Subject to any disclaimer, the term of this patent is extended or adjusted under 35 U.S.C. 154(b) by 260 days.

This patent is subject to a terminal disclaimer.

(21) Appl. No.: 12/953,286

(22) Filed: Nov. 23, 2010

(65) Prior Publication Data

US 2012/0131539 A1    May 24, 2012

(51) Int. Cl.
*G06F 9/44* (2006.01)
*G06F 11/36* (2006.01)

(52) U.S. Cl.
CPC ................... *G06F 11/3604* (2013.01)
USPC .......................................................... 717/100

(58) Field of Classification Search
USPC .......................................................... 717/100
See application file for complete search history.

(56) References Cited

U.S. PATENT DOCUMENTS

| | | | |
|---|---|---|---|
| 5,878,429 A * | 3/1999 | Morris et al. ........................... 1/1 |
| 5,923,882 A * | 7/1999 | Ho et al. ........................ 717/147 |
| 6,047,362 A | 4/2000 | Zucker |
| 6,260,075 B1 | 7/2001 | Cabrero et al. |
| 7,051,038 B1 * | 5/2006 | Yeh et al. ........................ 707/603 |
| 7,203,946 B2 | 4/2007 | Johnson et al. |
| 7,389,311 B1 | 6/2008 | Crescenti et al. |
| 7,458,022 B2 * | 11/2008 | Ramarao ........................ 715/236 |
| 7,739,282 B1 * | 6/2010 | Smith et al. .................... 707/736 |
| 7,774,757 B1 | 8/2010 | Awasthi et al. |
| 7,945,902 B1 | 5/2011 | Sahoo |
| 7,971,183 B2 | 6/2011 | Grechanik et al. |
| 7,971,184 B2 | 6/2011 | Grechanik et al. |
| 7,979,846 B2 | 7/2011 | Grechanik et al. |
| 7,984,429 B2 * | 7/2011 | Hunt .............................. 717/130 |
| 8,204,809 B1 | 6/2012 | Wise |
| 2003/0217193 A1 | 11/2003 | Thurston et al. |
| 2003/0229890 A1 | 12/2003 | Lau et al. |
| 2005/0138111 A1 | 6/2005 | Aton et al. |
| 2006/0059253 A1 | 3/2006 | Goodman et al. |
| 2006/0069961 A1 | 3/2006 | Kalyanaraman |
| 2006/0141983 A1 | 6/2006 | Jagannathan et al. |
| 2006/0184930 A1 | 8/2006 | Fuente et al. |
| 2007/0011667 A1 | 1/2007 | Subbiah et al. |
| 2007/0056037 A1 | 3/2007 | Focke et al. |
| 2007/0168957 A1 * | 7/2007 | Li et al. ......................... 717/120 |
| 2007/0294673 A1 * | 12/2007 | Guerrera et al. .............. 717/130 |

(Continued)

OTHER PUBLICATIONS

ELF-64 Object File Format applicant provided NPL on Nov. 23, 2010 (published May 27, 1998).*

(Continued)

*Primary Examiner* — Don Wong
*Assistant Examiner* — Theodore Hebert
(74) *Attorney, Agent, or Firm* — Lowenstein Sandler LLP

(57) ABSTRACT

A library controller that ranks shared libraries that are available from an operating system is described. In one embodiment, the library controller receives multiple different software, where each of the different software use one or more of the shared libraries. The library controller extracts library usage details for each of the multiple different software and provisioning details from each of the shared libraries. Furthermore, the library controller ranks the shared libraries based on the library usage and provisioning details.

13 Claims, 6 Drawing Sheets

(56) References Cited

U.S. PATENT DOCUMENTS

| | | | |
|---|---|---|---|
| 2008/0244177 | A1 | 10/2008 | Crescenti et al. |
| 2009/0037896 | A1 | 2/2009 | Grechanik et al. |
| 2009/0276771 | A1 | 11/2009 | Nickolov |
| 2010/0195503 | A1 | 8/2010 | Raleigh |
| 2010/0226594 | A1 | 9/2010 | Mikawa |
| 2010/0306737 | A1 | 12/2010 | Hamilton, II et al. |
| 2010/0318947 | A1 | 12/2010 | Motiani et al. |
| 2012/0131538 | A1 | 5/2012 | Das |
| 2012/0131539 | A1 | 5/2012 | Das |
| 2012/0131563 | A1 | 5/2012 | Das |
| 2012/0131564 | A1* | 5/2012 | Das ............................ 717/168 |
| 2012/0209895 | A1* | 8/2012 | He et al. ...................... 707/825 |

OTHER PUBLICATIONS

Library Usage (Published Jul. 12, 2008) retrieved from http://www.the-interweb.com/bdump/misc/top2000.txt on Oct. 23, 2012.*
Library Rank List (Published 2009) retrieved from http://www.the-interweb.com/bdump/misc/top2000.txt on Oct. 23, 2012.*
ELF-64 Object File Format, Version 1.5 Draft 2, May 27, 1998, 18 pages, http://downloads.openwatcom.org/ftp/devel/docs/elf-64-gen.pdf.
USPTO, Notice of Allowance for U.S. Appl. No. 12/953,084 (P836) mailed Dec. 21, 2012.
Richard S. Piepho et al., A Comparison of RISC Architectures, IEEE 1989, [Retrieved on Oct. 2, 2010]. Retrieved from the internet: <URL: http://ieeexplore.ieee.org/stamp/stamp.jsp?tp=&arnumber=31487> 12 pages (51-62).
Daniel Silakov et al., Improving Portability of Linux Application by Early Detection of Interoperability Issues, 2010 [Retrieved on Oct. 2, 2012]. Retrieved from the internet: <URL: http://www.springerlink.com/content/6271n751523807p2/fulltext.pdf> 14 Pages (357-370).
Library Usage (Published Jul. 12, 2008) retrieved from http://www.the-interweb.com/serendipity/index.php?/archives/109-Some-Win32-API-usage-statistics.html on May 24, 2013.
USPTO; Office Action for U.S. Appl. No. 12/953,285, mailed May 9, 2013.
USPTO, Office Action for U.S. Appl. No. 12/953,023 mailed May 22, 2013.
Lerch, Ryan, "Red Hat Enterprise Linux 5.3", Release Notes, copyright 2008, pp. 1-240 <Release_Notes_08.pdf>.
USPTO; Office Action for U.S. Appl. No. 12/953,285, mailed Oct. 1, 2013.
USPTO, Office Action for U.S. Appl. No. 12/953,023 mailed Oct. 17, 2013.
Google Books, "Leveraging Applications of Formal Methods, Verification, and Validation: 4th International Symposium on Leveraging Applications," ISoLA 2010, Heraklion, Crete, Greece, Oct. 18-21, 2010, Proceedings; published Dec. 23, 2010; retrieved from http://books.google.com/books?id=j8PFfxikBZQC on Dec. 2, 2013.
Springer Link, "Daniel Silakov et al., Improving Portability of Linux Application by Early Detection of Interoperability Issues: 4th International Symposium on Leveraging Applications," ISoLA 2010, Heraklion, Crete, Greece, Oct. 18-21, 2010, Proceedings, Part II; published 2010;retrieved from http://link.springer.com/chapter/10.1007%2F978-3-642-16561-0_34 on Dec. 2, 2013.
Eijkhout, Victor et al. "A Standard and Software for Numerical Metadata", Feb. 2009. [Retrieved on Mar. 5, 2014]. Retrieved from the internet: <URL: http://dl.acm.org/citation.cfm?id=1462174> 20 p. (1-20).
Wolpers, Martin et al. Tracking Actual Usage: the Attention Metadata Approach, 2007 [Retrieved Mar. 5, 2014]. Retrieved from the internet: <URL: http://eds.a.ebscohost.com/ehost/pdfviewer?sid+2f23b7ed-330f-47b5-857f-0f3355941e52%40sessionmgr4001&vid=2&hid-4102> 17 pages (106-121).
Ulrich Drepper et al., The Native POSIX Thread Library for Linux, 2003, [Retrieved on Jul. 11, 2013]. Retrieved from the internet: <URL: http://www.cs.utexas.edu/~witchel/372/lectures/POSIX_Linux_Threading.pdf> 20 pages (1-20).
USPTO; Office Action for U.S. Appl. No. 12,953,285, mailed Dec. 17, 2013.
USPTO, Office Action for U.S. Appl. No. 12/953,023 mailed Jan. 14, 2014.
USPTO, Notice of Allowance for U.S. Appl. No. 12/953,084 mailed Dec. 4, 2013.
USPTO, Notice of Allowance for U.S. Appl. No. 12/953,084 mailed Apr. 22, 2014.

* cited by examiner

FIND AND TRACK INFORMATION OF INTERFACE USAGE OF SOFTWARE LIBRARIES BY OTHER SOFTWARE

This application is related to co-pending U.S. patent application Ser. No. 12/953,285, filed on Nov. 23, 2010, and entitled "PROCESS OF FINDING OUT IF SOFTWARE WILL RUN ON AN OPERATING SYSTEM WITHOUT INSTALLING THAT SOFTWARE."

TECHNICAL FIELD

Embodiments of the present invention relate to a method and system for comparing software compatibility on an operating system. Specifically, embodiments of the invention relate to find and track software library usage of shared libraries of that operating system.

BACKGROUND

Software that runs on a computing device can use libraries provided by the operating system of that computing device that are shared among software that is executed on that operating system. For example, these shared libraries can be used to access operating system functions (e.g., reading files, writing files, file management, network communications, inter-process communications, memory management, string manipulations, user interface manipulations, mathematics functions, accessing other resources, doing graphical representation on a visual device, etc.). In addition, these shared libraries can change when the operating system changes or is updated. For example, upgrading to a newer version of an operating system can change the functions present in the shared library, change versions and arguments used in these functions, and/or change functionality of some, none or all of the library functions. As a result, software developed for one operating system may not work on another operating system. In the example above, upgrading to the new operating system may cause the software not to work on the new operating system whether the operating system is a different type of operating system or the new operating system is simply an update to an existing operating system. To determine if software is executable on a new operating system, the software is typically re-compiled and run on the new operating system.

When a new version of the operating is released, there can be a problem of whether a customer's software can run on that new version of operating software. If the shared libraries have been updated, they may be incompatible with the customer's software. Alternatively, software developer's may not know if shared libraries are important to software that runs on an operating system. Consequently, by updating a shared library, the developer risks breaking existing software.

DETAILED DESCRIPTION

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

A library controller that ranks shared libraries that are available from an operating system is described. In one embodiment, the library controller receives multiple different software, where each of the different software use one or more of the shared libraries. The library controller extracts library usage details for each of the multiple different software and provisioning details from each of the shared libraries. Furthermore, the library controller ranks the shared libraries based on the library usage and provisioning details.

Figure 1:
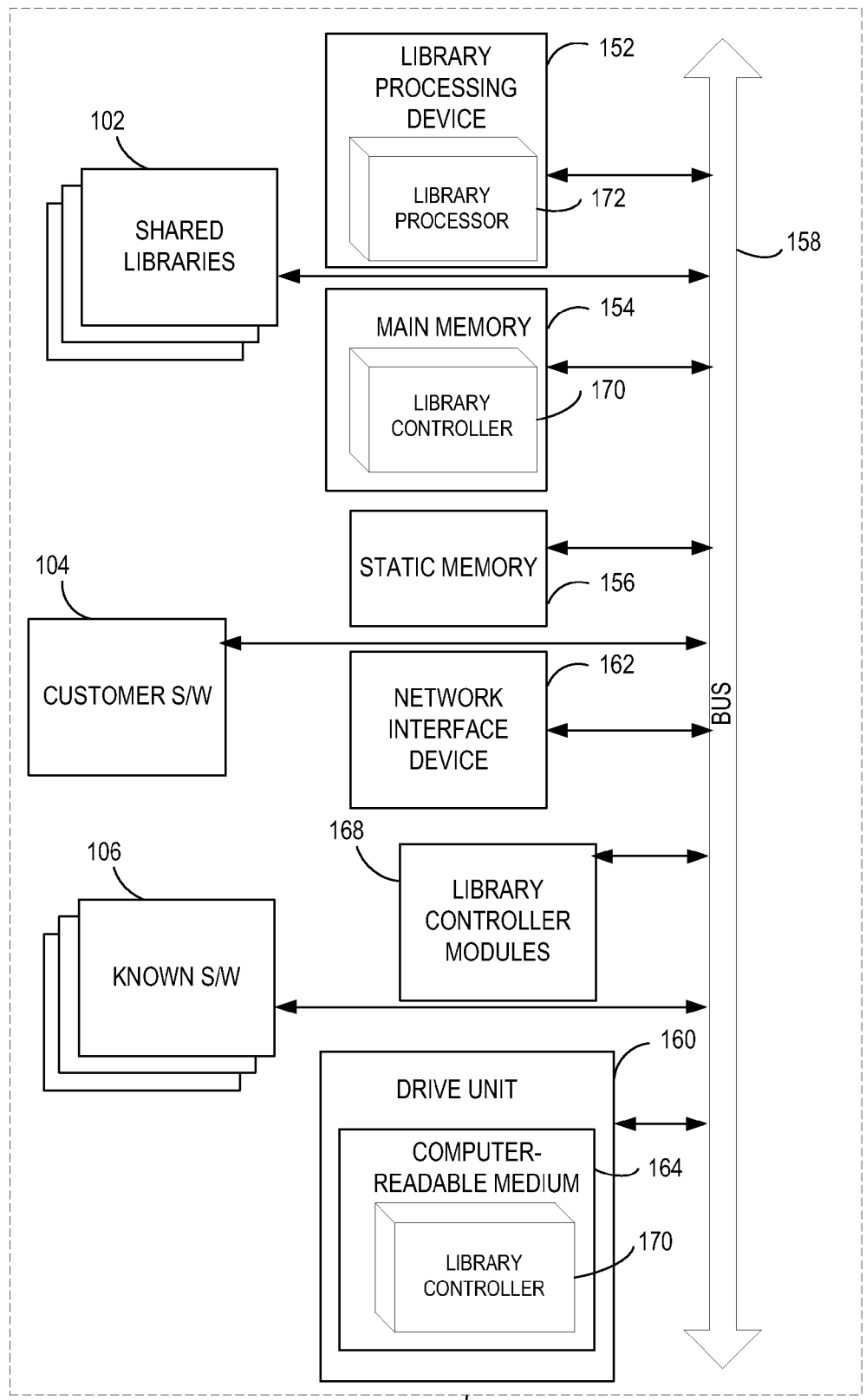
FIG. 1 is a block diagram of one embodiment of a library ABI/API controller.

FIG. 1 is a block diagram of one embodiment of a library application binary interface (ABI)/application programming interface (API) controller 100. In FIG. 1, library controller 100 is composed of shared libraries 102, customer software 104, and known software 106. As is known in the art, shared libraries 102 is code and data that provides services to independent programs and is typically shared among many different programs. For example, an operating system can provide shared libraries that implement different system functions that are used by a program, such as file access, networking capabilities, user interface functions, thread management, process management, common utilities (string manipulations, mathematical functions, etc.), etc.). Alternatively, the shared libraries can be provided by third parties and used by many different programs. These libraries 102 can be statically or dynamically linked into these programs. The structure of the shared libraries 102 is further discussed below with reference to FIGS. 2 and 3.

In one embodiment, an ABI is a low-level interface between software (e.g. customer software 104 and/or known software 106) and the operating system. In one embodiment, the ABI can include one or more of details about data type, size, alignment, calling convention, symbol version, system call numbers, binary format of object files, etc. In one embodiment, an API can define a library of routines to call, data structures to manipulate, and/or object classes to use.

In one embodiment, customer software 104 is a program developed by organization other than the company that produces the operating system and is software that uses the shared libraries. For example and in one embodiment, the customer software 104 can be special-purpose software that is used for the organization (e.g., media development software for media companies, specialized modeling software, etc.). This customer software 104 can use the shared libraries 102 to utilize system functions.

When a new (or updated) operating system becomes available, the customer software 104 may not run properly because the one or more of the functions of the shared libraries 102 have changed. For example and in one embodiment, an open_socket function was in one version of a library and this function was removed in the next version of that same library.

In one embodiment, library controller 100 compares the library functions usage of customer software 104 with the shared library 102 to determine if these libraries 102 can still support the customer software 104. Comparing the library usage is further described in FIG. 4 below.

In addition, the library controller 100 can compare the library functions provided with a plurality of known software 106 to determine which of the functions and/or libraries provided by shared libraries 104 are important. For example and in one embodiment, important functions and/or libraries can be those that are used by the known software libraries 106 more often than other libraries and/or functions. In another embodiment, important libraries are determined by of library usage and popularity of each of the known software 106. Determining library importance is further described in FIG. 5 below.

As illustrated in FIG. 1, the library controller 100 includes additional components (blocks 152-172). These additional components (blocks 152-172) are described in further detail below.

Figure 2:
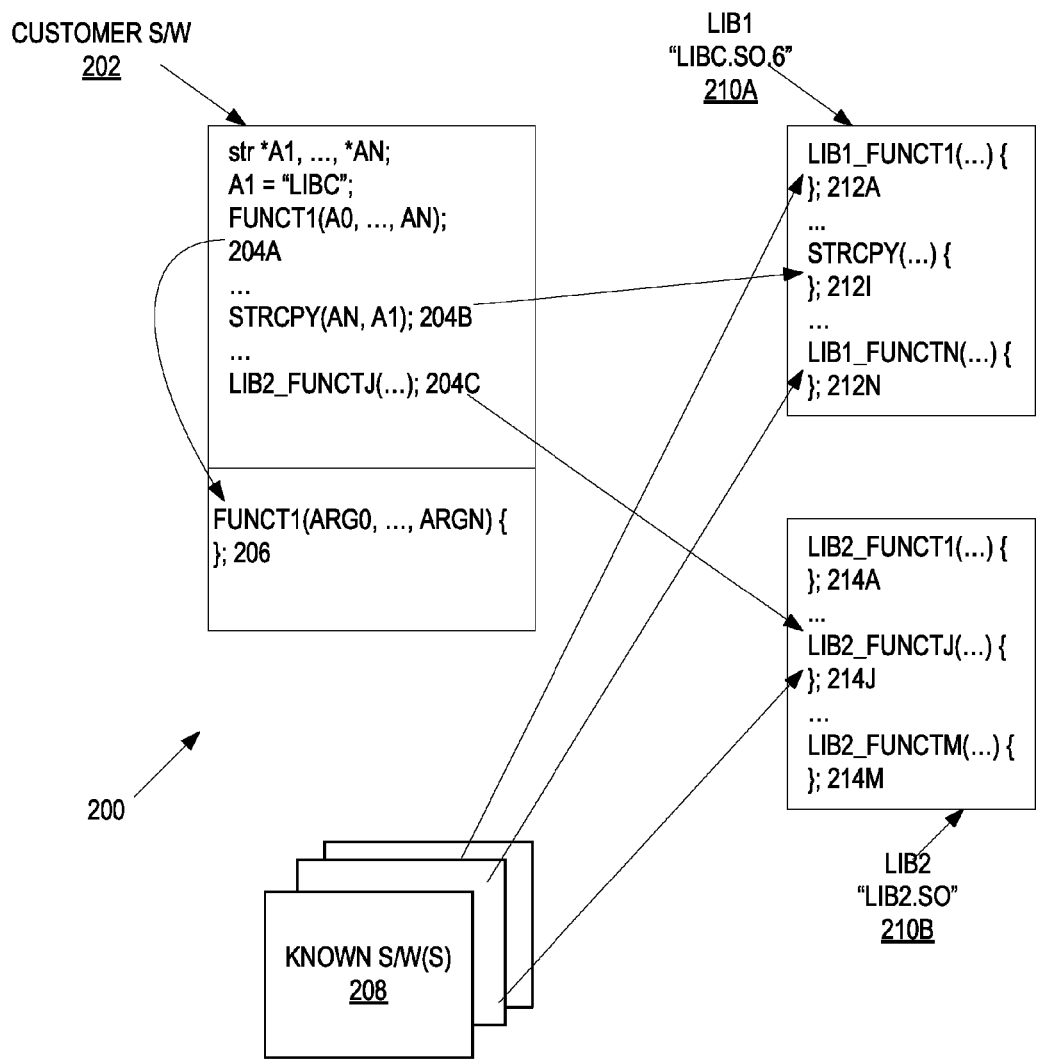
FIG. 2 is a block diagram of one embodiment of software that references different shared libraries.

As described above, each of the customer 104 and known software 106 as illustrated in FIG. 1 use the functions and/or libraries from shared libraries 102. FIG. 2 is a block diagram of one embodiment of software 202 and 208 that use different libraries 210A-B, such as libraries in files libc.so.6 210A and lib2.so 210B. In FIG. 2, customer software 202 uses functions from libraries lib1 210A and lib2 210B. In one embodiment, customer software 202 includes, at 204A, code for declaring variables A1 . . . An, and setting the variable A1 to zero. Furthermore, at 204A, customer software 202 makes a call to function funct1. Function funct1 206 is a function has code that is part of customer software 202 and is not available to other software.

In addition, customer software 202 uses libc.so.6 210A function STRCPY by calling this function at 204B. For example and in one embodiment, libc.so.6 is a shared library that provides many common system functions (string manipulations, etc.). Furthermore, customer software 202 uses lib2 210B function lib2_functionJ by calling this function at 204C. In one embodiment, lib2 210B can be another operating shared library, third party shared library, etc.

Furthermore, known software 206 uses functions from libraries libc.so.6 210A and lib2 210B. In one embodiment, a function in a shared library is a function as known in the art: the function is invoked using the function call and can have variable for passing data to and from the function. Furthermore, each function can have a version associated with it, in which different versions may or may not work the same way. Thus, one version of the function may differ than other versions of the same function. For example and in one embodiment, a function may be present in one version of the library and absent in the next library version.

Figure 3:
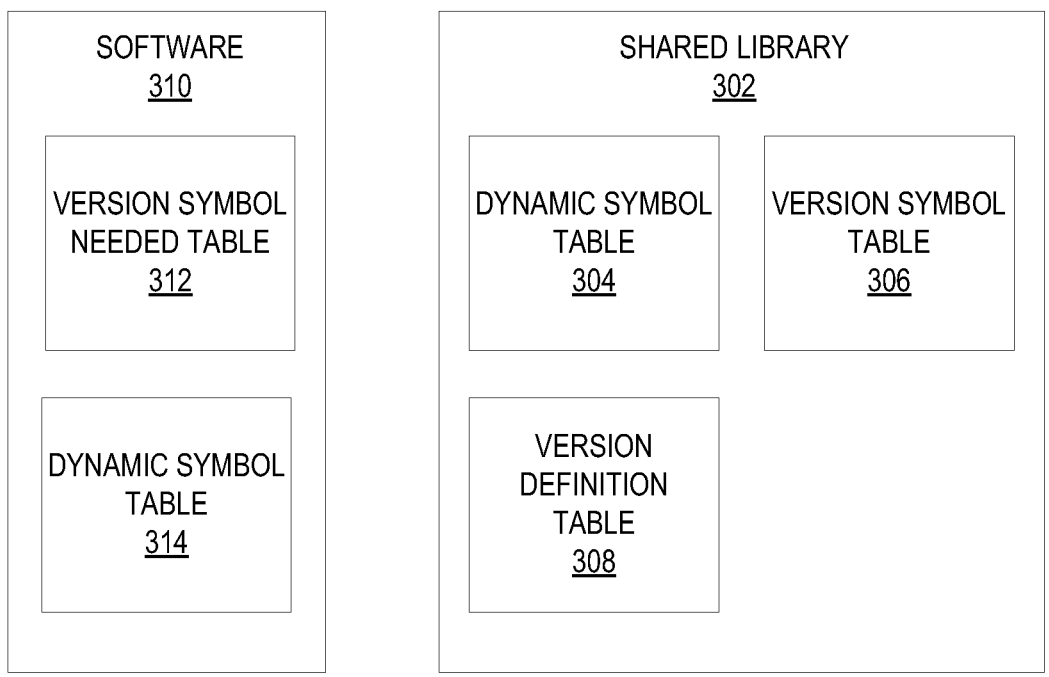
FIG. 3 is a block diagram of one embodiment of symbol tables in software and the shared library.

As described above, each function is a library has an interface, a set of symbols, and a version. In addition, the software includes a table of symbols needed by the software. FIG. 3 is a block diagram of one embodiment of symbol tables in software and the library. In FIG. 3, software 310 includes version symbol needed table 312 and dynamic symbol table 314. In one embodiment, this table 312 includes the version of the external symbols needed by the software. In one embodiment, a symbol, such as a library function name, can have an associated version. For example and in one embodiment, the version symbol needed table 312 lists the different symbol versions referenced in the software. In another embodiment, this table 312 gives the respective source file name for each version name.

For example and in one embodiment and referring to FIG. 2, the customer software 202 would have a version symbol needed table 312 with the entries for STRCPY and LIB2_FUNCTJ, which are symbols for the corresponding function calls at 204B-C. In this embodiment, customer software 202 would use version 2.3, for example, of STRCPY and 5.1 of LIB2_FUNCTJ. Furthermore, the version needed table would include the file names of the libraries that hold STRCPY and LIB2_FUNCTJ. In this embodiment, the filenames would be "LIBC.SO.6" and "LIB2.SO", respectively. For example and in one embodiment, a compile can can be informed as to which libraries are required and the compile can keeps this information in a table.

Shared library 302 includes dynamic symbol table 304, version symbol table 306, and version definition table 308. In one embodiment, the dynamic symbol table 304 includes the symbols referenced in the library. For example and in one embodiment, in an Executable and Linkable Format (ELF) object library, the dynamic symbol table is .dynsym table. In one embodiment, the version symbol table 306 indicates that a version number is either defined or needed for each of the dynamic symbols in the dynamic symbol table 304. For example and in one embodiment, the version symbol table 306 is an array of integer values. Each value in this table is used as an index into either version definition table 308 or version symbol needed table 310. In one embodiment, the value zero and one have a special interpretation: If the value is zero, the symbol is local, not available outside the object for which the symbol was defined within. If the value is one, the symbol is globally available and defined within an object. In one embodiment, an object can be an ELF file or other type of library file that is being used to check for symbols and/or other data. In one embodiment, the version symbol table is the .gnu.version table as used in an ELF object library.

In one embodiment, the version definition table 308 is a table that lists the versions defined in the shared library 302. For example and in one embodiment, the version definition table 308 is the .gnu.version_d table of an ELF object library. In one embodiment, the software 310 can further include the tables as listed in the shared library 302 and visa versa.

Referring to the example above and in reference with FIG. 2, the dynamic symbol table 304 would have entries for STRCPY and/or LIB2_FUNCTJ, which are symbols for the corresponding functions in the libraries of shared library 302. In one embodiment, STRCPY and LIB2_FUNCTJ are in different shared libraries, which are in different files. In this embodiment, the shared library 302 is for LIB1.SO.6, the dynamic symbol table 304 would include the symbol STRCPY.

Furthermore, in this embodiment, the version symbol table 308 and version definition table 308 includes an entry for STRCPY and/or LIB2_FUNCT2. In this embodiment, the entry in the version symbol table would be an index into version definition table 308. For example in one embodiment, the version symbol table includes an entry for STRCPY, which is an index into the version definition table. This index points to an entry in the version definition table, that has the version of the STRCPY function, such as a value 2.3 or 3.0. If the value is 2.3, in this embodiment, this version of STRCPY matches up with the required version for the customer software 202. If the value is 3.0, this version of STRCPY does not match up with the required version for the customer software 202. Because the version does not match, this function in this library may not work with the customer software 202.

Figure 4:
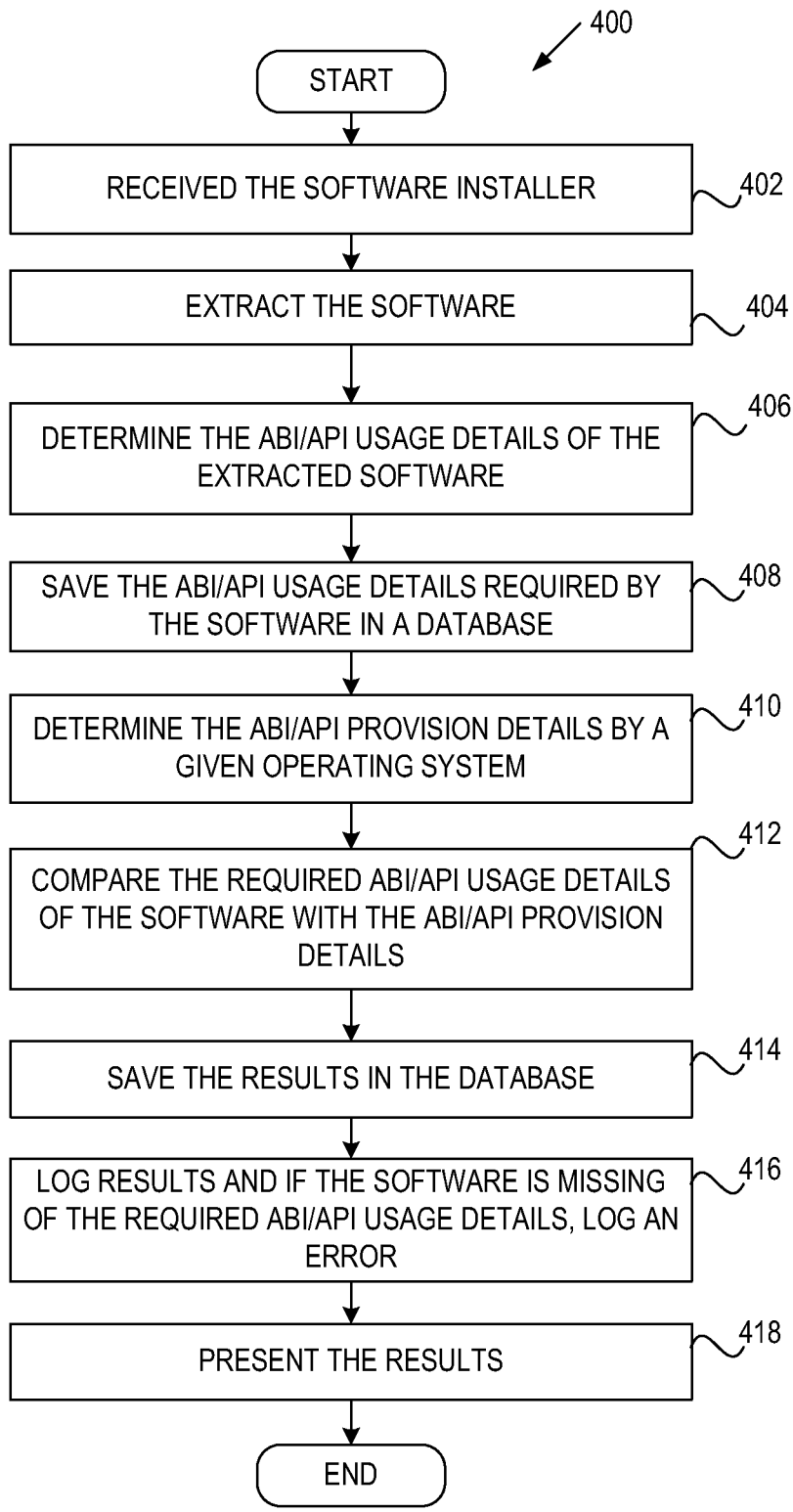
FIG. 4 is a flowchart of one embodiment of a process for determining if customer software will run on an operating system.

FIG. 4 is a flowchart of one embodiment of a process for determining if customer software will run on an operating system. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 400 is performed by an library controller, such as library controller 10 of FIG. 1.

Referring to FIG. 4, process 400 begins with processing logic receiving a software installer at bock 402. In one embodiment, the software installer include software executable(s), objects, libraries, data, configuration information, installer scripts, etc., and other information that is used to install the software on a computer. In one embodiment, the software installer is a software package, which software packaged in an archive format to be installed by a package management system or a self-sufficient installer. In one embodiment, the software installer includes customer software 202 as described in FIG. 2 above. In this embodiment, the software installer includes the software and other components used to install the software (files, data, configuration information, etc.). For example and in one embodiment, the software installer can be a RedHat Package Manager (RPM) file, a tar file, a zip file, an executable, etc. or any software installation file known in the art. In another embodiment, process 400 receives the software instead of the installer for that software. In this embodiment, process 400 additionally uses a list of supporting files for this software, where the supporting files list the other components used to install the software (files, data, configuration information, etc.).

At block 404, process 400 extracts the software from the received software installer. In one embodiment, process 400 extracts the software from the software installer using one of the known ways in the art of extracting software (RPM package extraction, processing the tar image, unzipping the file, running the executable, etc.). In one embodiment, process 400 extracts the software by determining the software installer file format and running the appropriate program. In one embodiment, the result of extracting the software is a directory of files that includes the desired software.

Process 400 determines the ABI/API usage details of the extracted software at block 406. In one embodiment, process 400 executes software that is used to interrogate the extracted software for the ABI/API usage details. In one embodiment, process 400 invokes a tool that is used to interrogate the symbol tables that are in the extracted software. For example and in one embodiment, process 400 uses a tool to read the dynamic symbol table 314 and version symbol needed 312 table of the customer software 310 as described in FIG. 3 above.

In one embodiment, the tool used by process 400 is dependent on the operating system the software is intended to run on. For example and in one embodiment, if the extracted software is to be run on a Linux-type operating system and the extracted software is an ELF executable, process 400 can use the tool "eu-readelf" to read the dynamic symbol table and the version needed table of an ELF executable. Process 400 can use others tools known in the art to read the dynamic symbol tables (readelf, objdump, nm, etc.) In this embodiment, process 400 reads the dynamic symbol table of the extracted software using the command "eu-readelf" with the "-s" option. For example and in one embodiment, to extract the dynamic symbol table for the file listing program "ls", process 400 runs the command:

$ eu-readelf-s/bin/ls

This results in a listing of the symbols in the executable "ls." For example, in one embodiment, and with reference to FIG. 2 above, process 400 would retrieve the symbols, "strcpy", "AN", and "A1". In one embodiment, the "eu-readelf" returns a listing of all the symbols in the "/bin/ls" file.

Furthermore, in this example, process 400 extracts the symbol version needed using the "eu-readelf" command with the "-v" symbol. Using the example for the "ls" program above, to retrieve the symbol versions needed, process 400 runs the command:

$ eu-readelf-V/bin/ls

This results in a listing of the symbol versions needed for each of the symbols in the executable "ls." For example, in one embodiment, and with reference to FIG. 2 above, process 400 would retrieve the symbols, "strcpy" and the version symbol for strcpy function of "2.3" from the extracted software. In one embodiment, the "eu-readelf" returns a listing of all the symbols in the "/bin/ls" file.

By using the above tools, process 400 extracts the ABI and/or API of shared libraries that are being used by the extracted software. This can later compared with the ABI and/or API provision details of the shared libraries to determine if there is a problem with the extracted software and the version of libraries used by this software. At block 408, process 400 saves the ABI/API library usage details required by the extracted software in the database.

Process 400 determines the ABI/API provisioning details of the shared libraries for a given operating system at block 410. In one embodiment, process 400 identifies the different shared libraries used by the extracted software and determines the ABI/API provisioning details for each of the identified shared libraries. In one embodiment, process 400 determines the shared library ABI/API provisioning details by retrieving these details from a database that stores these details.

In another embodiment, for some or all of the shared libraries used by the extracted software, process 400 calculates the shared library ABI/API provisioning details. In this embodiment, for each shared library to be calculated, process 400 invokes a tool that is used to interrogate the symbol tables that are in the extracted software. For example and in one embodiment, process 400 uses a tool to read the dynamic symbol table 304, version symbol needed 306, and version definition table 306 of the shared library 302 as described in FIG. 3 above.

In one embodiment, the tool used by process 400 at block 410 is dependent on the operating system the software is intended to run on. For example and in one embodiment, if the extracted software is to be run on a Linux-type operating system and the extracted software is an ELF executable, process 400 can use the tool "eu-readelf" to read the dynamic symbol table, version definition table, and the version needed table of an ELF executable. In this embodiment, process 400 reads the dynamic symbol table of the extracted software using the command "eu-readelf" with the "-s" option. For example and in one embodiment, to extract the dynamic symbol table for the shared library "libc.so.6", process 400 runs the command:

$ eu-readelf-s/lib/libc.so.6

This results in a listing of the symbols in the shared library "libc.so.6". For example, in one embodiment, and with reference to FIG. 2 above, process 400 would retrieve the symbols, "strcpy" and the version symbol for strcpy function of "2.3" from libc.so.6. In one embodiment, the "eu-readelf" returns a listing of all the symbols in the "/lib/libc.so.6" file.

Furthermore, in this example, process 400 extracts the symbol version needed using the "eu-readelf" command with the "-V" symbol. Using the example for the shared library "libc.so.6" above, to retrieve the symbol versions needed, process 400 runs the command:

$ eu-readelf-V/lib/libc.so.6
This results in a listing of the symbol versions needed for each of the symbols in the shared library "libc.so.6". In one embodiment, the "eu-readelf" returns a listing of all the symbols in the "/lib/libc.so.6" file.

In addition, in this example, process 400 extracts the symbol version definition using the "eu-readelf" command, also with the "-V" symbol. Using the example for the shared library "libc.so.6" above, to retrieve the symbol version definitions, process 400 runs the command:
$ eu-readelf-V/lib/libc.so.6
This results in a listing of the symbol version definitions for each of the symbols in the shared library "libc.so.6". For example, in one embodiment, and with reference to FIG. 2 above, process 400 would retrieve the symbols, "strcpy" and the version symbol for strcpy function of "2.3" from the extracted software. In one embodiment, the "eu-readelf" returns a listing of all the symbols in the "/lib/libc.so.6" file.

Thus, by different invocations of the shared library too (e.g., eu-readelf), process 400 extracts the ABI/API provisioning details from the shared library. At block 412, process 400 compares the extracted software ABI/API usage details determined at block 406 with the shared librar(ies) ABI/API provisioning details. In one embodiment, process 400 compares the library names, functions names, function arguments, and functions versions between the ABI/API usage details and ABI/API provisioning details. Using the example above to illustrate the comparison, process 400 would compare the usage detail from the extracted software (e.g., customer software 202) with the provisioning details from the shared library (e.g., libc.so.6 210A). In this example, process 400 would compare the symbols, argument types, and versions between the usage and provisioning details. In the example illustrated above with Reference to FIG. 2, process 400 compares the symbols used by customer software 202, which is STRCPY, AN, A1, and libc.so.6, which is the same with the symbols STRCPY, AN, A1. In this example, the symbols are the same and this comparison would note that the symbols used and provided are the same. However, if the symbols were difference, or had different types, the comparison would determine a difference between the ABI/API library usage and the ABI/API library provisioning. In one embodiment, argument type information is determined using debug information and kept in a separate table.

In addition, process 400 compares the version of the library symbols used and provided. For example and in one embodiment, if process 400 determines that the version of the library function provided is 3.0 and that the library function used is 2.3, process 400 would determine a difference the ABI/API library usage and the ABI/API library provisioning. Alternatively, if both the library function provided and used are for a version of 2.3, the comparison of the library function versions are the same. Process 400 saves the results of comparison in a database at block 414.

At block 416, process 400 logs the comparison results. If software is missing any of the required ABI/API usage details, process 400 further logs an error. For example and in one embodiment, process 400 could send an email, log an error in a log file, etc. Process 400 presents the results at block 418. In one embodiment, process 400 displays the results on a display that can be read by a user.

Figure 5:
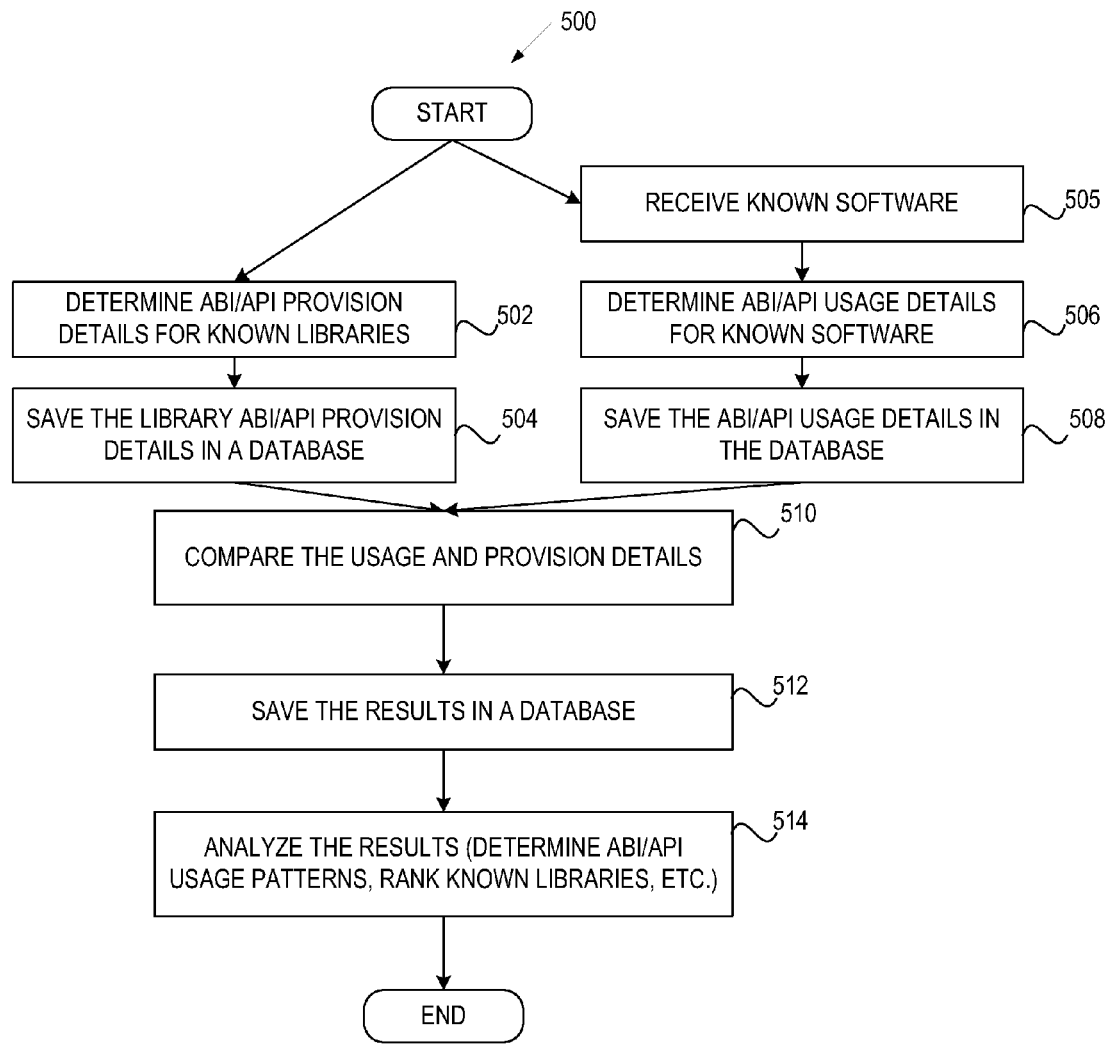
FIG. 5 is a flowchart of one embodiment of a process for determining which shared libraries are important to known software.

In FIG. 4, process 400 determines if the extracted software is missing any of the ABI/API usage details. This process can be used for customized software to determine if this software can run on a given operating system. Process 400 does this by extracting the APBI/API usage details of the software and compares this usage details with the provisioning ABI/API details of the shared libraries. The system of comparing usage and provisioned ABI/APT can also be used to determine which of the shared libraries are important to a set of known software for a given operating system. FIG. 5 is a flowchart of one embodiment of a process for determining which libraries are important to known software. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 500 is performed by an library controller, such as library controller 100 of FIG. 1.

Referring to FIG. 5, process 500 begins with processing logic determining all of the ABI/API provisioning details for known libraries at block 502. In one embodiment, process 500 retrieves or calculates the ABI/API provisioning details for each of the known libraries for the given operating system using process as described above in FIG. 4, block 410 above. For example in one embodiment, process 500 determines the library symbols provided (e.g., library names, functions names, etc.), function argument types, symbols versions, etc. While in one embodiment, the known libraries is a list of libraries provided by the operating system, in alternate embodiment, the known software is a different list of libraries (third party libraries, etc.). At block 504, process 500 saves the library ABI/API provisioning details in a database.

Process 500 receives the known software at block 505. At block 506 process 500 determines the known software ABI/API software usage details. In one embodiment, process 500 determines the ABI/API usage details for each of the known software as described in FIG. 4, block 406 above. For example in one embodiment, process 500 determines the known software symbols needed (e.g., library names, functions names, etc.), function argument types, symbols versions, etc. While in one embodiment, the known software is a list of software advertised to run on a given operating system, in alternate embodiment, the known software is a different list of software (software in a repository, etc.). Process 500 saves the ABI/API usage details in the database at block 510. At block 512, process 500 saves the comparison results in a database.

Process 500 analyzes the comparison results at block 514. In one embodiment, process 500 analyzes the ABI/API usage pattern of the known software. For example in one embodiment, process 500 find the symbols/libraries the software is using and creates result sets. In one embodiment, process 500 ranks the shared library usage to determine which of the shared libraries are more important than other shared libraries. For example in one embodiment, process 500 ranks libraries based on which of the known software uses a library more than others. In another example and in another embodiment, process 500 ranks libraries based on which libraries are used by popular software.

Figure 6A:
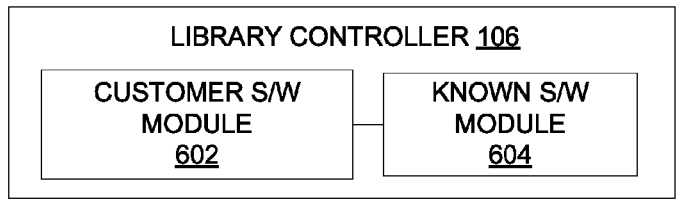
FIG. 6A is a block diagram of a library interface processor that analyzes library usage of software.

FIG. 6A is a block diagram of a library controller 100 that analyzes library usage of software. In FIG. 6A, the library controller 100 includes customer software module 602 and known software module 604. Customer software module 602 determines if customer software will run on an operating system. The customer software module 602 is further described in FIG. 6B below. Known software module 604 determines which of shared libraries is important for a given operating system. The known software module 604 is further described in FIG. 6C below.

Figure 6B:
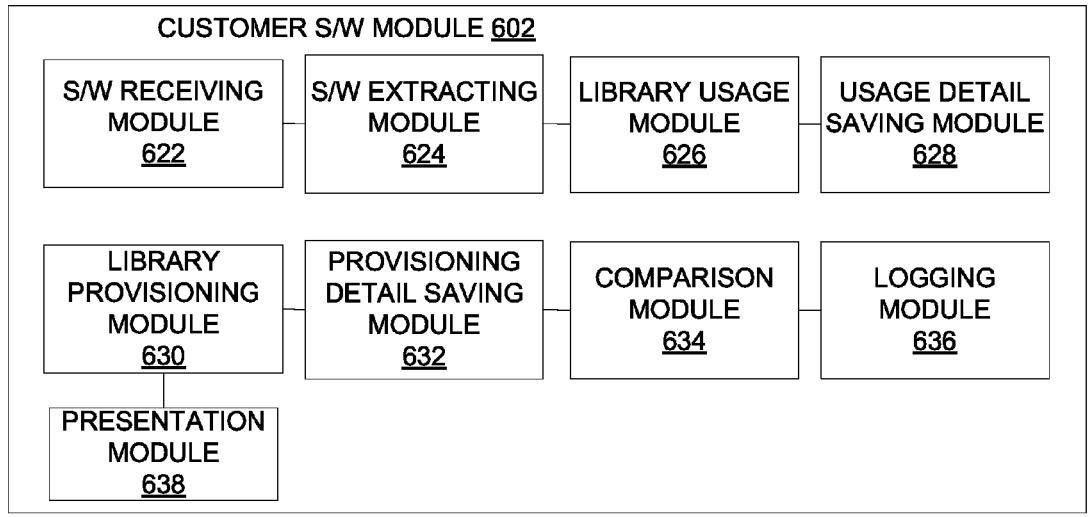
FIG. 6B is a block diagram of a customer software module that determines if customer software will run on an operating system.

FIG. 6B is a block diagram of a customer software module 602 that determines if customer software will run on an operating system. In FIG. 6B, customer software module 602 includes software receiving module 622, software extracting module 624, library usage detail module 626, usage detail saving module 628, library provisioning detail module 630, provisioning detail saving module 632, comparison module 634, logging module 636, and presentation module 638. Software receiving module 622 receives the software installer as described in FIG. 4, block 402 above. Software extracting module 624 extracts the software from the as described in FIG. 4, block 404 above. Library usage detail module 626 determines the extracted software ABI/API usage detail as described in FIG. 4, block 406 above. Usage detail saving module 628 saves the extracted software ABI/API usage detail as described in FIG. 4, block 408 above. Library Provisioning detail module 630 determines the library ABI/API provisioning details as described in FIG. 4, block 412 above. Provisioning detail saving module 632 saves the library ABI/API usage detail as described in FIG. 4, block 414. Comparison module 634 compares the usage and provisioning details as described in FIG. 4, block 412 above. Logging module 636 logs the comparison results as described in FIG. 4, block 416 above. Presentation module 638 present the comparison results as described in FIG. 4, block 418 above.

Figure 6C:
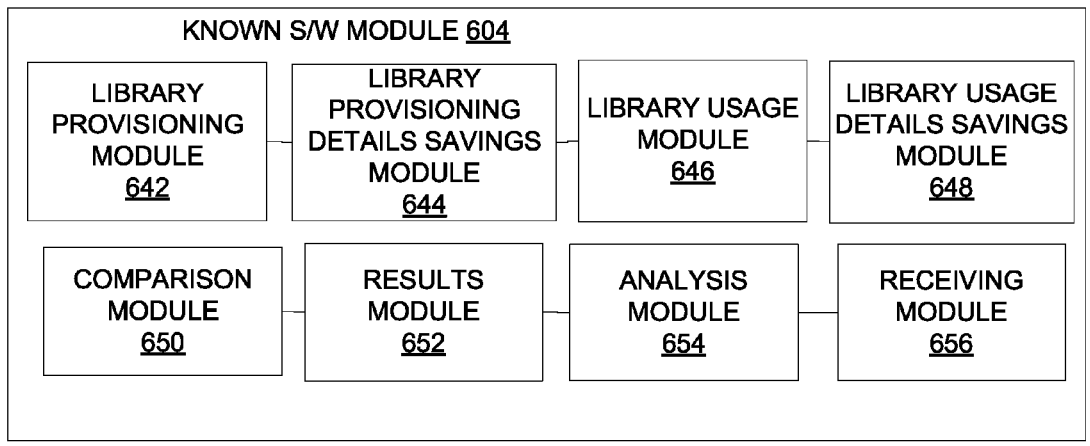
FIG. 6C is a block diagram of a known software module that determines if which libraries are important to known software.

FIG. 6C is a block diagram of a known software module 604 that determines if which libraries are important to known software. In FIG. 6C, known software module 604 includes library provisioning details module 642, library provisioning details saving module 644, library usage module 646, library usage details saving module 648, comparison module 650, results module 656, logging module 654, and receiving module 656. Library provisioning details module 642 determines ABI/API library provisioning details as described in FIG. 5, block 502 above. Library provisioning details saving module 644 saves the ABI/API library provisioning details as described in FIG. 5, block 504 above. Library usage details module 646 as described in FIG. 5, block 506 above. Library usage details saving module 648 as described in FIG. 5, block 502 above. Comparison module 650 compares the usage and provisioning details as described in FIG. 5, block 510 above. Results module 652 saves the comparison results as described in FIG. 5, block 512 above. Analysis module 654 analyzes the results as described in FIG. 5, block 514 above. Receiving module receives the known software as described in FIG. 5, block 505 above While in one embodiment, the modules of library controller 100 are executed on one device, in alternate embodiments, these modules could be executed by different devices. For example and in one embodiment, usage details module 628 could be executed on a different device than the other modules. In this embodiment, a customer computer can compute usage details, which are saved by a computer being used by an operating system company's computer.

As described above, FIG. 1 includes a diagram of one embodiment of an library controller 100 that analyzes shared libraries. Within the library controller 100 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer analyzing shared libraries and the server computer acting as one of the database management servers) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or an machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary library controller 100 includes an library processing device 152, a main memory 154 (e.g., read-only memory (ROM), flash memory, dynamic random access memory (DRAM) such as synchronous DRAM (SDRAM), etc.), a static memory 156 (e.g., flash memory, static random access memory (SRAM), etc.), and a secondary memory 160 (e.g., a data storage device in the form of a drive unit, which may include fixed or removable computer-readable storage medium), which communicate with each other via a bus 158.

Library processing device 152 represents one or more general-purpose processing devices such as a microprocessor, central processing unit, or the like. More particularly, the processing device 152 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Library processing device 152 may also be one or more special-purpose processing devices such as an application specific integrated circuit (ASIC), a field programmable gate array (FPGA), a digital signal processor (DSP), network processor, or the like. Library processing device 152 is configured to execute the library processor 172 for performing the operations and steps discussed herein. The library controller 100 may further include a network interface device 162.

The secondary memory 160 may include a machine-readable storage medium (or more specifically a computer-readable storage medium) 164 on which is stored one or more sets of instructions (e.g., the library controller 170) embodying any one or more of the methodologies or functions described herein. The library controller 170 may also reside, completely or at least partially, within the main memory 154 and/or within the library processing device 152 during execution thereof by the library controller 100, the main memory 154 and the library processing device 152 also constituting machine-readable storage media. The library controller 170 may further be transmitted or received over a network via the network interface device 162.

The computer-readable storage medium 164 may also be used to store the library controller 170 persistently. While the computer-readable storage medium 164 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The library controller modules 168, components and other features described herein (for example in relation to FIG. 1) can be implemented as discrete hardware components or integrated in the functionality of hardware components such as ASICS, FPGAs, DSPs or similar devices. In addition, the library controller modules 168 can be implemented as firmware or functional circuitry within hardware devices. Further, the library controller modules 168 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "retrieving," "comparing," "presenting," "ranking," "determining," "saving," "calculating," "computing," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for analyzing shared libraries been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:

extracting one or more first symbol and symbol version pairs from one or more first symbol tables in a plurality of different programs to be executed within an operating system, wherein each of the one or more first symbol tables uses one or more of a plurality of shared libraries within the operating system;

identifying one or more second symbol and symbol version pairs provided by the plurality of shared libraries, wherein each symbol version in the one or more first symbol and symbol version pairs and the one or more second symbol and symbol version pairs comprises a sequential version identifier;

comparing the one or more first symbol and symbol version pairs to the one or more second symbol and symbol version pairs to identify ones of the one or more first symbol and symbol version pairs that are made available by the plurality of shared libraries;

in view of the ones of the one or more first symbol and symbol version pairs that are made available by the plurality of shared libraries, determining that a first library version in the plurality of shared libraries is used by more of the plurality of different programs than a second library version in the plurality of shared libraries or that the first library version is used by more popular ones of the plurality of different programs than the second library version; and ranking, by a processing device, the plurality of shared libraries in view of the ones of the one or more first symbol and symbol version pairs that are made available by the plurality of shared libraries, wherein ranking comprises ranking the first library version higher than the second library version in view of the determination that the first library version is used by more of the plurality of different programs than the second library version or that the first library version is used by the more popular ones of the plurality of different programs than the second library version.

2. The computer-implemented method of claim 1, wherein identifying the one or more second symbol and symbol version pairs comprises extracting the one or more second symbol and symbol version pairs from one or more second symbol tables in the plurality of shared libraries.

3. The computer-implemented method of claim 1, further comprising storing the one or more first symbol and symbol version pairs in a database.

4. The computer-implemented method of claim 1, further comprising storing the one or more second symbol and symbol version pairs in a database.

5. The computer-implemented method of claim 1, wherein determining comprises determining that the first library version is used by more of the plurality of different programs than the second library version, and wherein ranking the first library version higher than the second library version is in view of the determination that the first library version is used by more of the plurality of different programs than the second library version.

6. The computer-implemented method of claim 1, wherein determining comprises determining that the first library version is used by more popular ones of the plurality of different programs than the second library version, and wherein ranking the first library version higher than the second library version is in view of the determination that the first library version is used by the more popular ones of the plurality of different programs than the second library version.

7. A non-transitory computer readable storage medium having instructions stored thereon that, when executed by a processing device, cause the processing system to perform operations comprising:
   extracting one or more first symbol and symbol version pairs from one or more first symbol tables in a plurality of different programs to be executed within an operating system, wherein each of the one or more first symbol tables uses one or more of a plurality of shared libraries within the operating system;
   identifying one or more second symbol and symbol version pairs provided by the plurality of shared libraries, wherein each symbol version in the one or more first symbol and symbol version pairs and the one or more second symbol and symbol version pairs comprises a sequential version identifier;
   comparing the one or more first symbol and symbol version pairs to the one or more second symbol and symbol version pairs to identify ones of the one or more first symbol and symbol version pairs that are made available by the plurality of shared libraries;
   in view of the ones of the one or more first symbol and symbol version pairs that are made available by the plurality of shared libraries, determining that a first library version in the plurality of shared libraries is used by more of the plurality of different programs than a second library version in the plurality of shared libraries or that the first library version is used by more popular ones of the plurality of different programs than the second library version; and
   ranking, by the processing device, the plurality of shared libraries in view of the ones of the one or more first symbol and symbol version pairs that are made available by the plurality of shared libraries, wherein ranking comprises ranking the first library version higher than the second library version in view of the determination that the first library version is used by more of the plurality of different programs than the second library version or that the first library version is used by the more popular ones of the plurality of different programs than the second library version.

8. The computer readable storage medium of claim 7, wherein identifying the one or more second symbol and symbol version pairs comprises extracting the one or more second symbol and symbol version pairs from one or more second symbol tables in the plurality of shared libraries.

9. The computer readable storage medium of claim 7, wherein determining comprises determining that the first library version is used by more of the plurality of different programs than the second library version, and wherein ranking the first library version higher than the second library version is in view of the determination that the first library version is used by more of the plurality of different programs than the second library version.

10. The computer readable storage medium of claim 7, wherein determining comprises determining that the first library version is used by more popular ones of the plurality of different programs than the second library version, and wherein ranking the first library version higher than the second library version is in view of the determination that the first library version is used by the more popular ones of the plurality of different programs than the second library version.

11. A system comprising:
   a memory to store an operating system, a plurality of shared libraries, and a plurality of different programs to be executed within the operating system; and
   a processing device, coupled to the memory, to:
      extract one or more first symbol and symbol version pairs from one or more first symbol tables in the plurality of different programs, wherein each of the one or more first symbol tables uses one or more of the plurality of shared libraries within the operating system;
      identify one or more second symbol and symbol version pairs provided by the plurality of shared libraries, wherein each symbol version in the one or more first symbol and symbol version pairs and the one or more second symbol and symbol version pairs comprises a sequential version identifier;
      compare the one or more first symbol and symbol version pairs to the one or more second symbol and symbol version pairs to identify ones of the one or more first symbol and symbol version pairs that are made available by the plurality of shared libraries;
      in view of the ones of the one or more first symbol and symbol version pairs that are made available by the plurality of shared libraries, determine that a first library version in the plurality of shared libraries is used by more of the plurality of different programs than a second library version in the plurality of shared libraries or that the first library version is used by more popular ones of the plurality of different programs than the second library version; and
      rank the plurality of shared libraries in view of the ones of the one or more first symbol and symbol version pairs that are made available by the plurality of shared libraries, wherein the processing device is to rank the plurality of shared libraries by ranking the first library version higher than the second library version in view of the determination that the first library version is used by more of the plurality of different programs than the second library version or that the first library version is used by the more popular ones of the plurality of different programs than the second library version.

12. The system of claim 11, wherein the processing device is to determine that the first library version is used by more of the plurality of different programs than the second library version, and rank the first library version higher than the second library version in view of the determination that the first library version is used by more of the plurality of different programs than the second library version.

13. The system of claim 11, wherein the processing device is to determine that the first library version is used by more popular ones of the plurality of different programs than the second library version, and rank the first library version higher than the second library version in view of the determination that the first library version is used by the more popular ones of the plurality of different programs than the second library version.

* * * * *